United States Patent
Zhao et al.

(10) Patent No.: US 12,422,040 B2
(45) Date of Patent: Sep. 23, 2025

(54) GEAR SELECTION ACTUATOR FOR A SHIFT-BY-WIRE MECHANISM

(71) Applicant: GHSP, INC., Holland, MI (US)

(72) Inventors: Jack Zhao, Shanghai (CN); Shavin Zhang, Shanghai (CN); Gary Chen, Shanghai (CN); Zhengwei Ye, Shanghai (CN)

(73) Assignee: GHSP, Inc., Holland, MI (US)

( * ) Notice: Subject to any disclaimer, the term of this patent is extended or adjusted under 35 U.S.C. 154(b) by 74 days.

(21) Appl. No.: 18/548,241

(22) PCT Filed: Mar. 30, 2021

(86) PCT No.: PCT/CN2021/084045
§ 371 (c)(1),
(2) Date: Aug. 29, 2023

(87) PCT Pub. No.: WO2022/204960
PCT Pub. Date: Oct. 6, 2022

(65) Prior Publication Data
US 2024/0133465 A1    Apr. 25, 2024
US 2024/0229929 A9    Jul. 11, 2024

(51) Int. Cl.
*F16H 61/32* (2006.01)
*F16H 59/08* (2006.01)

(52) U.S. Cl.
CPC .............. *F16H 61/32* (2013.01); *F16H 59/08* (2013.01); *F16H 2059/081* (2013.01); *F16H 2061/326* (2013.01)

(58) Field of Classification Search
CPC .... F16H 61/32; F16H 59/08; F16H 2059/081; F16H 2061/326
See application file for complete search history.

(56) References Cited

U.S. PATENT DOCUMENTS

| | | | |
|---|---|---|---|
| 7,139,652 B2 | 11/2006 | Kikuchi | |
| 9,334,949 B2 | 5/2016 | Fett et al. | |
| 9,939,064 B2 | 4/2018 | Cyren et al. | |
| 10,677,351 B2 * | 6/2020 | Mochizuki | G05G 5/04 |
| 2019/0203826 A1 | 7/2019 | Jiran et al. | |
| 2020/0173538 A1 | 6/2020 | Lotz et al. | |

FOREIGN PATENT DOCUMENTS

| | | |
|---|---|---|
| CN | 1530571 A | 9/2004 |
| CN | 104854382 A | 8/2015 |
| CN | 105934609 A | 9/2016 |
| CN | 211343989 U | 8/2020 |
| JP | 2007263167 A | 10/2007 |
| JP | 2011106680 A | 6/2011 |
| JP | 2018200065 A | 12/2018 |

* cited by examiner

*Primary Examiner* — Terence Boes
(74) *Attorney, Agent, or Firm* — Price Heneveld LLP

(57) ABSTRACT

A shift actuator for a transmission includes a drive assembly coupled with a selector interface. A transmission selector operates between a plurality of transmission settings. A threaded actuator is rotationally operated by the drive assembly. A carriage linearly operates along the threaded actuator to define a plurality of actuator positions that correspond to the transmission settings. An actuator arm extends between the carriage and the transmission selector to translate linear operation of the carriage to rotational operation of the transmission selector.

20 Claims, 9 Drawing Sheets

GEAR SELECTION ACTUATOR FOR A SHIFT-BY-WIRE MECHANISM

FIELD OF THE DISCLOSURE

The present device is in the field of selection mechanisms, and more specifically, an actuator for a gear selection mechanism that can be used for adjusting a transmission via a shift-by-wire selection interface.

BACKGROUND OF THE DISCLOSURE

Within conventional vehicles, transmissions include multiple gears for modifying the operational characteristics of the vehicle. These transmissions often use mechanical transmissions that are shifted manually through the use of an operating system. In addition, shift-by-wire mechanisms can be used for adjusting the gear settings of transmissions using a digital interface. Within a shift-by-wire interface, an actuator is typically used for modifying the selected gear for the transmission.

SUMMARY OF THE DISCLOSURE

According to a first aspect of the present disclosure, a shift actuator for a transmission includes a drive assembly coupled with a selector interface. A transmission selector operates between a plurality of transmission settings. A threaded actuator is rotationally operated by the drive assembly. A carriage linearly operates along the threaded actuator to define a plurality of actuator positions that correspond to the transmission settings. An actuator arm extends between the carriage and the transmission selector to translate linear operation of the carriage to rotational operation of the transmission selector.

According to another aspect of the present disclosure, a gear selector assembly includes a selector interface that selectively operates a drive assembly having a threaded actuator. A carriage linearly operates along a rotational axis of the threaded actuator to define a plurality of actuator positions. An actuator arm extends between the carriage and a transmission interface. Linear operation of the carriage defines a rotational operation of the actuator arm about the transmission interface. A position sensor is in communication with the selector interface, the actuator arm and a motor of the drive assembly to locate the carriage and the actuator arm at the plurality of actuator positions. A transmission selector is included and the linear operation of the carriage along the threaded actuator defines the plurality of actuator positions that correspond to respective gear positions of the transmission selector.

According to another aspect of the present disclosure, a selector assembly includes a selector interface that selectively operates a drive assembly via a controller. The drive assembly includes a threaded actuator. A carriage translates along the threaded actuator to define a plurality of gear positions. A transmission selector rotates about an interface axis. A sensor assembly is in communication with the controller and the carriage. Linear operation of the carriage defines a rotational operation of a magnet of the sensor assembly and the transmission selector about the interface axis. The sensor assembly cooperates with the drive assembly to locate the carriage and the transmission selector at a selected gear position of the plurality of gear positions.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
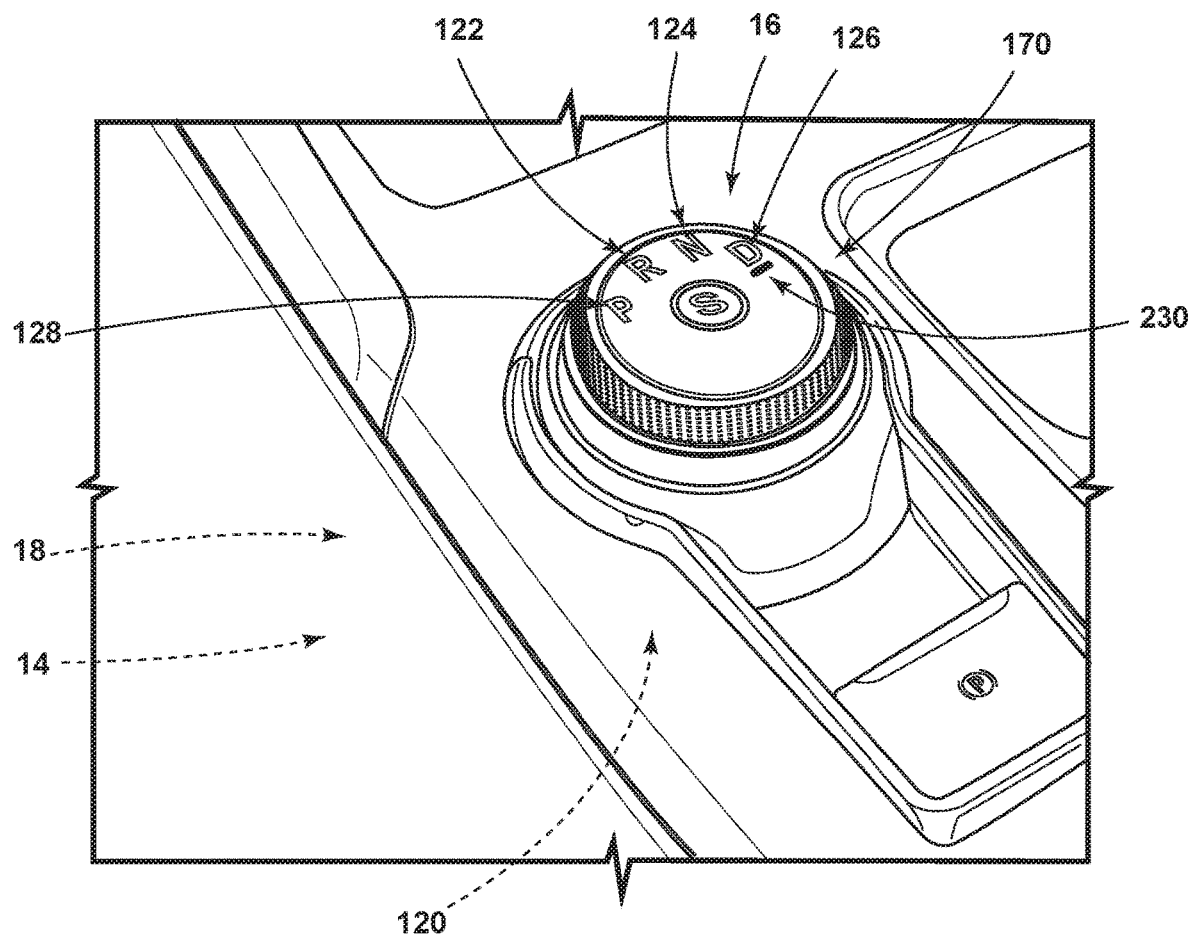
FIG. 1 is a perspective view of an exemplary selector interface for a vehicle.
Figure 2:
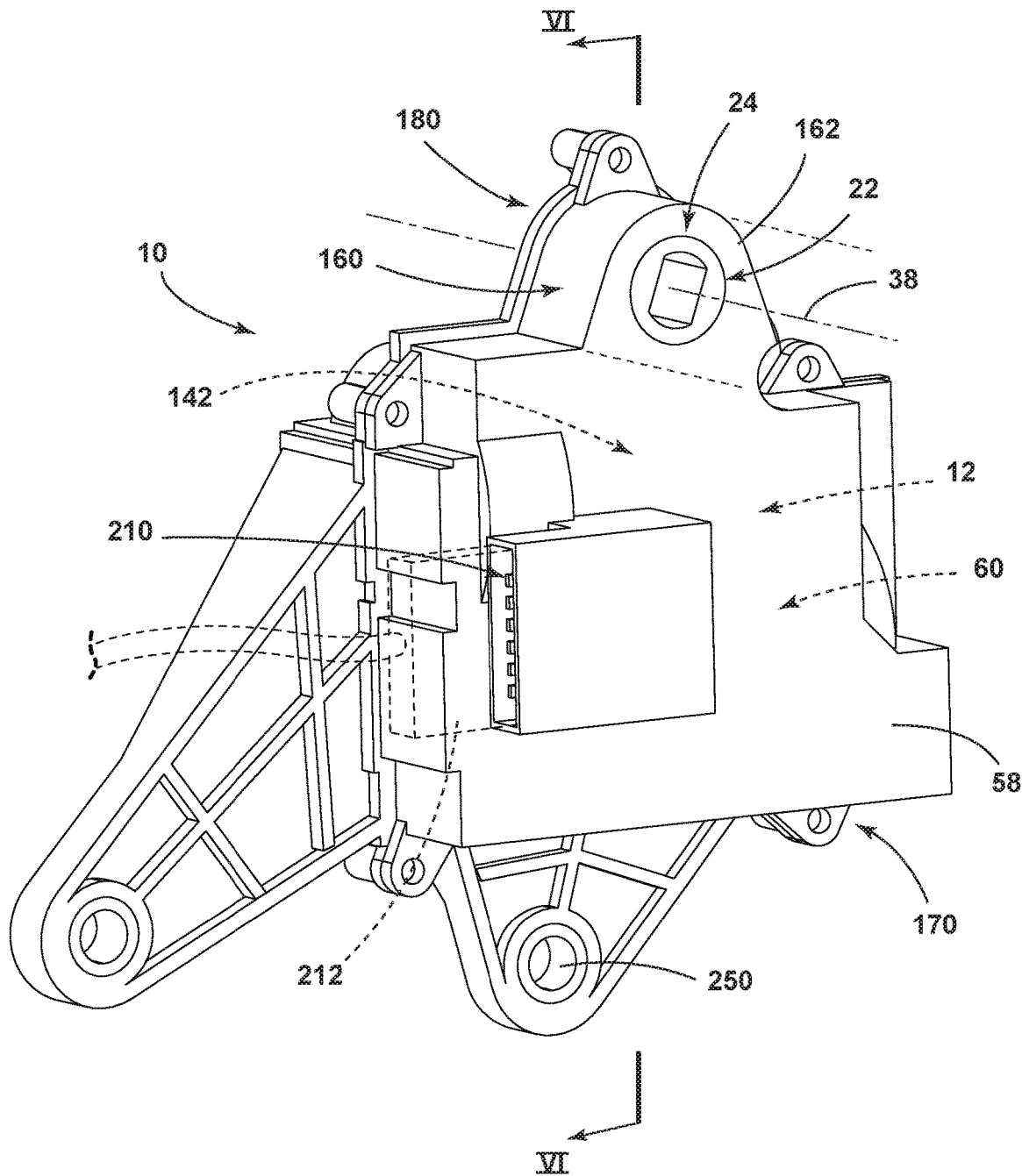
FIG. 2 is a perspective view of an exemplary selector actuator for use in connection with the selector interface and shift-by-wire transmission.
Figure 3:
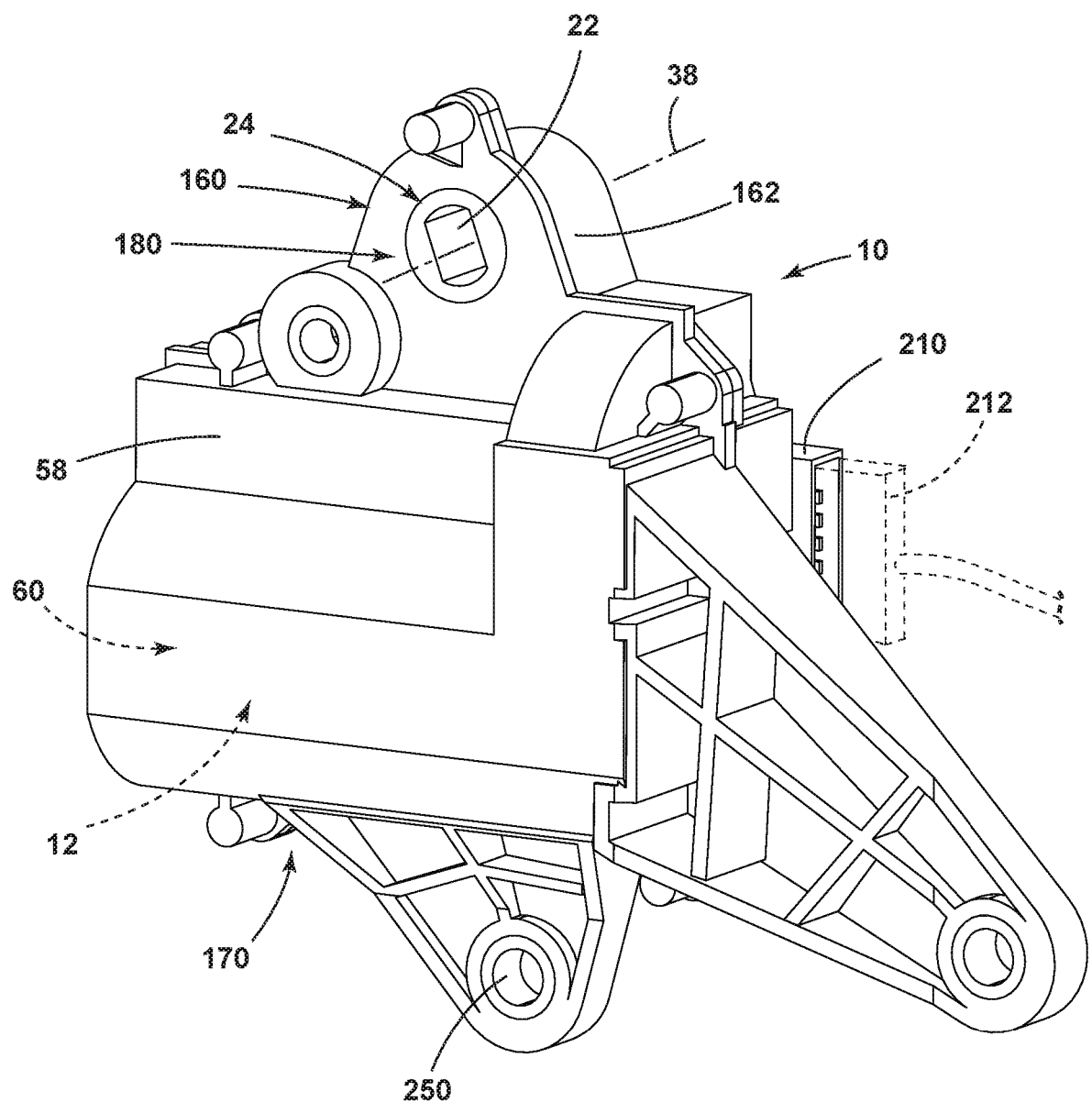
FIG. 3 is another perspective view of the selector actuator of FIG. 2.
Figure 4:
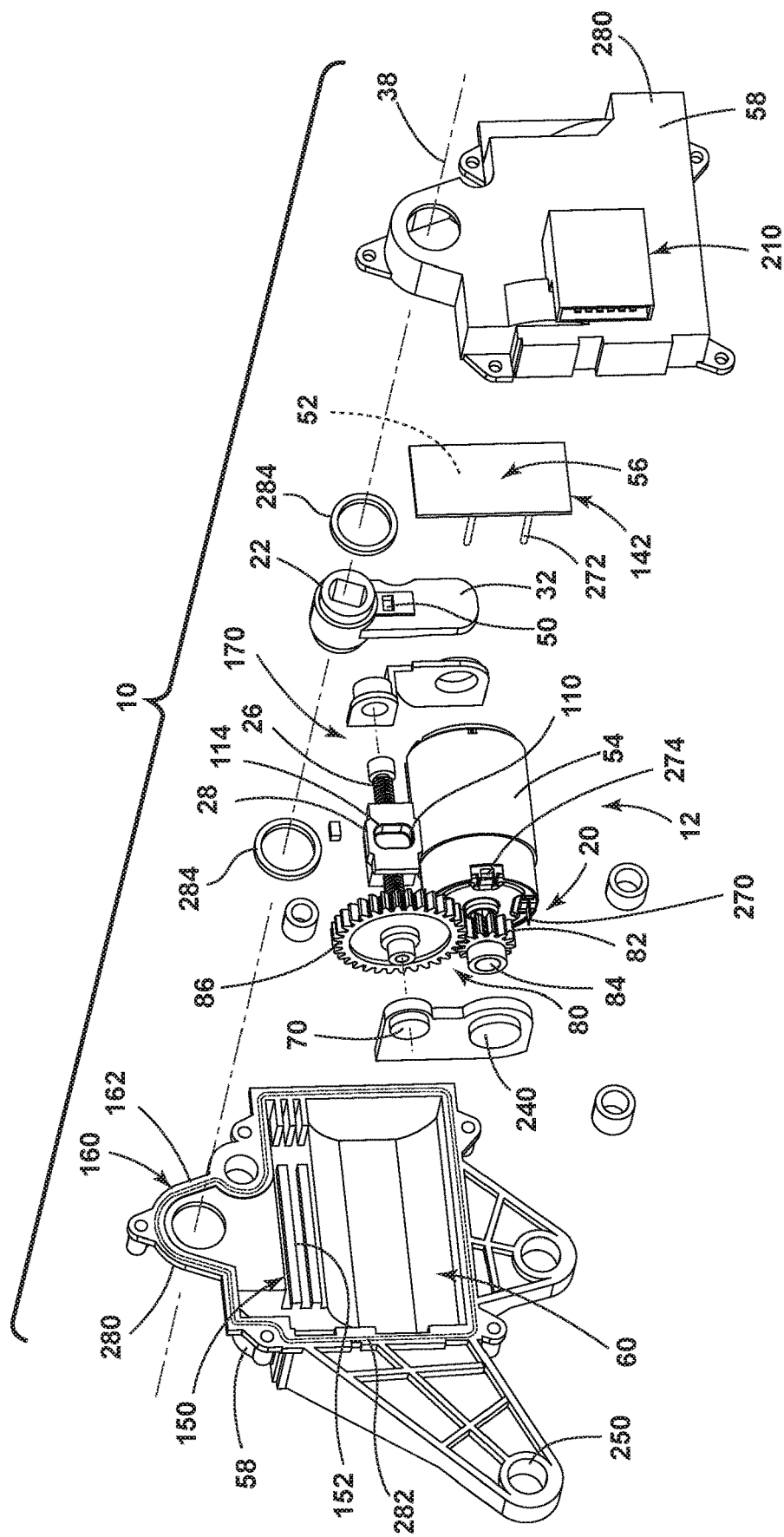
FIG. 4 is an exploded perspective view of the selector actuator of FIG. 2.
Figure 5:
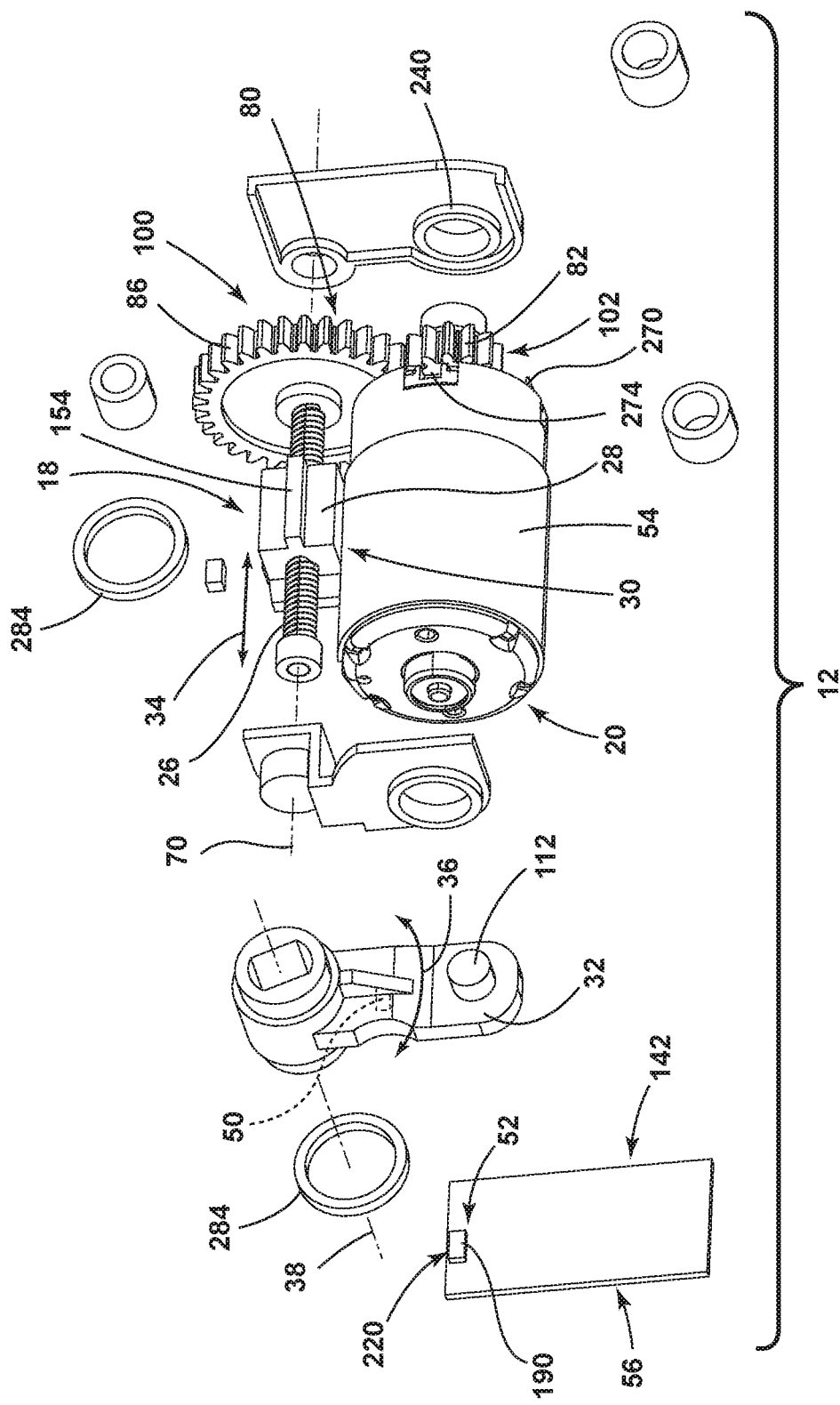
FIG. 5 is an exploded perspective view of an actuating assembly for the selector actuator.
Figure 6:
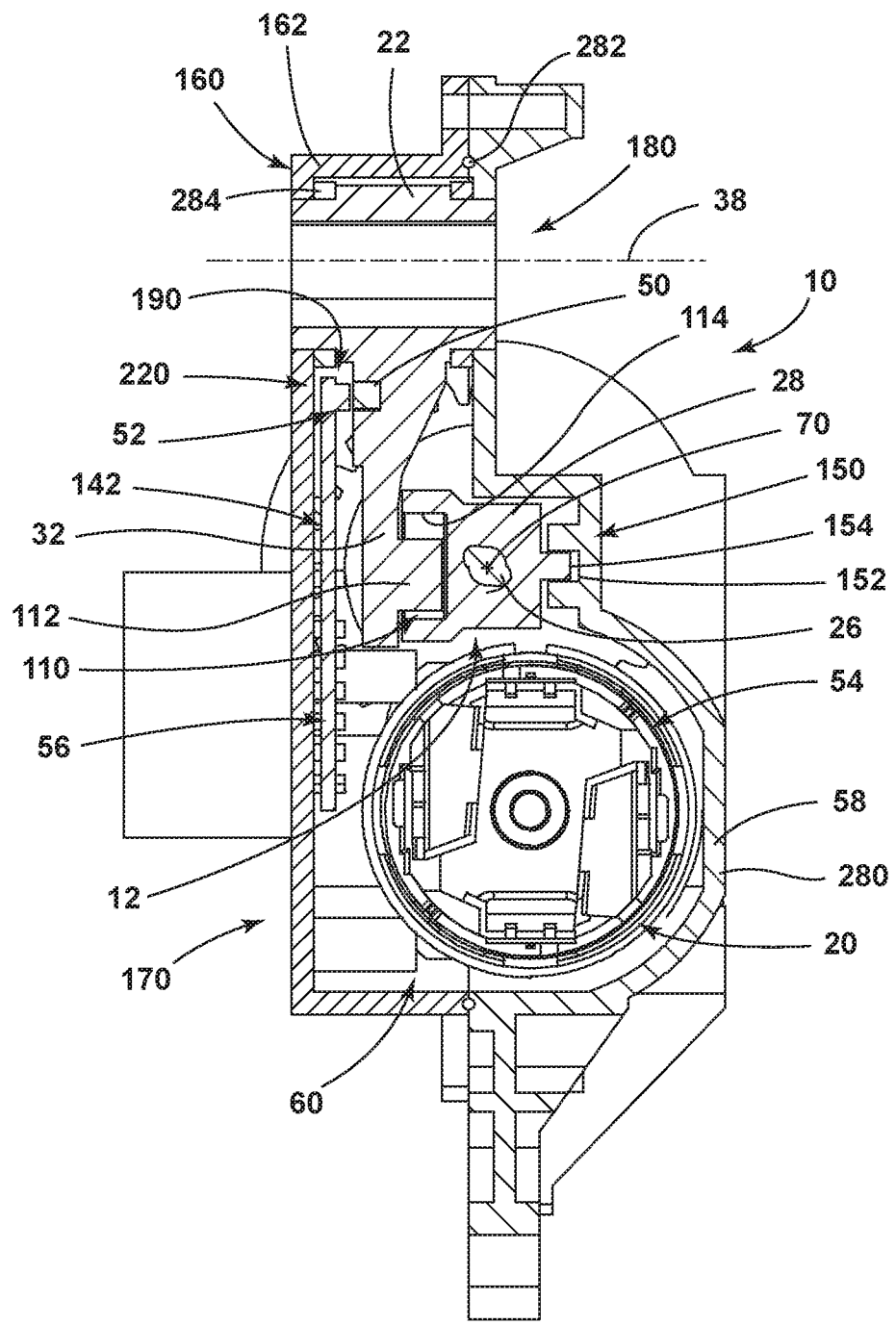
FIG. 6 is a cross-sectional view of the selector actuator of FIG. 3 taken along line VI-VI.

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-9, reference numeral 10 generally refers to a shift actuator, which can include a selector actuator 12 for making various adjustments to a mechanical assembly, such as a transmission 14. The selector actuator 12 is configured to receive instructions from a selector interface 16. Instructions from a selector interface 16 operate the selector actuator 12 to move the mechanical assembly between various selected positions of a plurality of possible positions, such as gear positions 18. According to various aspects of the device, the shift actuator 10 for the transmission 14 includes a drive assembly 20 that is coupled with the selector interface 16. A transmission selector 22 operates between a plurality of transmission settings 24. A threaded actuator 26 is rotationally operated by the drive assembly 20. A carriage 28 linearly operates along the threaded actuator 26 to define a plurality of actuator positions 30 that correspond to the plurality of transmission settings 24. An actuator arm 32 extends between the carriage 28 and the transmission selector 22. This actuator arm 32 operates to translate a linear operation 34 of the carriage 28 to a rotational operation 36 of the actuator arm 32 and the transmission selector 22. Accordingly, the actuator arm 32 and the transmission selector 22 each operate about an interface axis 38 of the transmission selector 22.

Referring again to FIGS. 2-9, the actuator arm 32 for the shift actuator 10 includes a positioning magnet 50 that operates relative to a position sensor 52 that is in communication with the drive assembly 20. The positioning magnet 50 and the position sensor 52 cooperate with one another to selectively operate one or more motors 54 of the drive assembly 20 to define the plurality of transmission settings 24. The position sensor 52 can be incorporated within a printed circuit board (PCB) 56. The drive assembly 20, the carriage 28, the positioning magnet 50 and the position sensor 52 are each disposed within the outer housing 58, such as within a motor cavity 60 of the outer housing 58. Typically, the PCB 56 can be attached to a portion of the outer housing 58 or held in a stable position within the motor cavity 60 as the carriage 28, the actuator arm 32, the positioning magnet 50 and other components of the shift actuator 10 operate within the motor cavity 60 of the outer housing 58.

The drive assembly 20 for the shift actuator 10 can include one or more motors 54 that operate the threaded actuator 26. As exemplified in FIGS. 2-9, the drive assembly 20 includes a single dual-direction motor 54 that can rotate the threaded actuator 26 in clockwise and counterclockwise directions about a rotational axis 70 of the threaded actuator 26. It is also contemplated that the drive assembly 20 can include multiple motors 54, such as two single direction motors 54, for operating the threaded actuator 26 in clockwise and counterclockwise directions, respectively, about the rotational axis 70 of the threaded actuator 26.

Referring again to FIGS. 4-9, the drive assembly 20 can also include a gear train 80 that extends between the motor 54 and the threaded actuator 26. This gear train 80 can include one or more drive gears 82 that are attached to the drive shaft 84 of each motor 54. In addition, the threaded actuator 26 can include a separate operating gear 86 that meshes with the drive gear 82. The gear train 80 can include various idler gears that can be positioned within the gear train 80.

In various aspects of the device, as exemplified in FIGS. 4-9, the drive gear 82 and the operating gear 86 can have different sizes to define a gear-reduction mechanism 100 within the drive assembly 20 for the shift actuator 10. This gear-reduction mechanism 100 can be used for increasing the speed of the carriage 28, or increasing the mechanical advantage of the motor 54 for driving the carriage 28 along the threaded actuator 26 to define the plurality of actuator positions 30 of the shift actuator 10. As exemplified in FIGS. 4-9, the drive gear 82 is smaller than the operating gear 86 such that the operating gear 86 moves at a slower rotational rate than the drive gear 82. This difference in size between the operating gear 86 and the drive gear 82 results in an increased output torque 102 at the operating gear 86 for rotating the threaded actuator 26 and conducting the linear operation 34 of the carriage 28. Through this configuration, the motor 54 can be a relatively low-power motor 54 due to the mechanical advantage obtained through the difference in sizes between the drive gear 82 and the operating gear 86 for the gear train 80.

Referring again to FIGS. 4-9, the carriage 28 and the actuator arm 32 slidably operate relative to one another through the use of a receiver 110 and a protrusion combination. The receiver 110 includes an elongated aperture 114 or slot that allows the protrusion 112 to operate within the receiver 110. During operation of the carriage 28 and the actuator arm 32, the protrusion 112 is afforded limited movement relative to the carriage 28 in a direction that is generally perpendicular to the linear operation 34 of the carriage 28. In this manner, the protrusion 112 can smoothly translate within the aperture 114 of the receiver 110. Typically, the protrusion 112 is positioned on the actuator arm 32 and the receiver 110 is defined within the carriage 28, although these positions can be switched.

Referring again to FIGS. 4-9, the elongated aperture 114 of the receiver 110, relative to the protrusion 112, provides for the linear operation 34 of the carriage 28 in combination with the rotational operation 36 of the actuator arm 32. Stated another way, as the carriage 28 undergoes the linear operation 34 along the threaded actuator 26, the actuator arm 32, and the protrusion 112 therefor, move in a rotational operation 36 through an arcuate path about the interface axis 38 of the transmission selector 22. Through this interface between the protrusion 112 and the receiver 110, the actuator arm 32 can be secured to the carriage 28. This secure engagement provides for a smooth translation of the linear operation 34 of the carriage 28 into the rotational operation 36 of the actuator arm 32. The use of the actuator arm 32 that extends between the carriage 28 and the transmission selector 22 provides for an additional mechanical advantage within the shift actuator 10. As the carriage 28 undergoes the linear operation 34 along the threaded actuator 26, the actuator arm 32 has a radial length that serves to provide an additional mechanical advantage between the carriage 28 and the transmission selector 22. Accordingly, the multiple mechanical advantages provided within the shift actuator 10 allow for the size of the motor 54 to be significantly decreased, while simultaneously providing the necessary output torque 102 for operating the gear train 80, the threaded actuator 26, the carriage 28, the actuator arm 32 and the transmission selector 22 for operating the transmission 14.

According to various aspects of the device, as exemplified in FIGS. 1-9, the shift actuator 10 and the transmission selector 22 are operably coupled with, or in engagement with, a shift-by-wire mechanism 120 for manipulating the gear positions 18 of the transmission 14. The shift-by-wire mechanism 120 receives instructions via movement of the shift actuator 10, and the transmission selector 22 in particular, which in turn activates a separate mechanical assembly for operating the transmission 14 between the various gear positions 18. According to various aspects of the device, it is contemplated that the shift actuator 10 can also be attached directly to the mechanical assembly for operating the transmission 14 in the absence of a shift-by-wire mechanism 120. Typically, the shift-by-wire mechanism 120 will be utilized in combination with a shift actuator 10 for manipulating the transmission 14 between the various gear positions 18. The plurality of transmission settings 24 that corresponds to the various gear positions 18 of the transmission 14 can include at least a reverse position 122, a neutral position 124, and a drive position 126. Additional transmission settings 24 can be included for alternate drive settings, transmission settings 24 for different road and weather conditions, and other similar transmission settings 24. In certain aspects of the device, the shift actuator 10 can also include a park position 128 as one of the transmission settings 24. It is also contemplated that the park setting can also be activated through the use of a separate assembly that is dedicated to activating a park position 128 of the transmission 14. This dedicated assembly can also be utilized for a park lock setting of the shift-by-wire mechanism 120 and the transmission 14.

Figure 7:
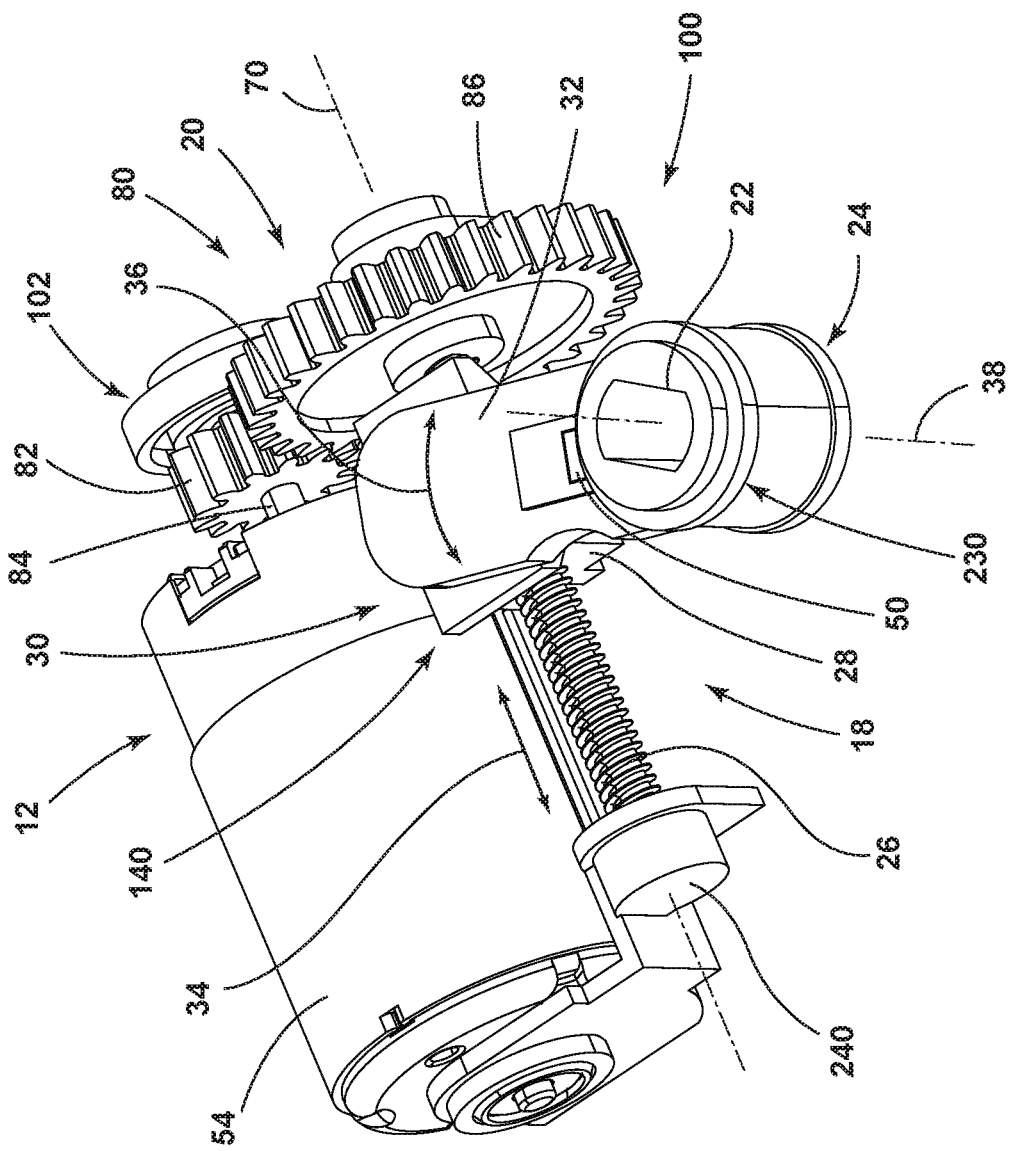
FIG. 7 is a perspective view of the actuator assembly shown in a first transmission setting.
Figure 8:
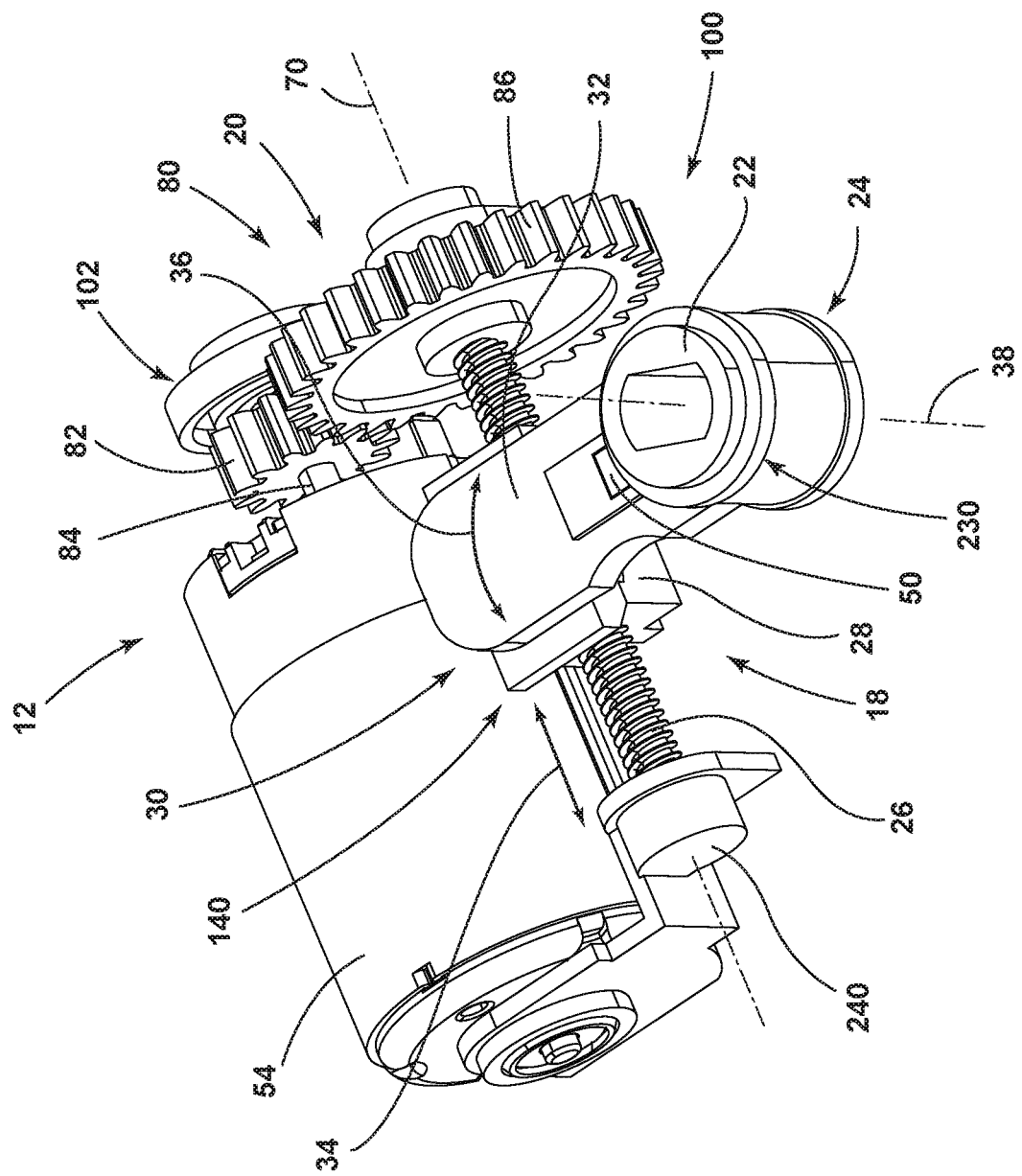
FIG. 8 is a perspective view of the actuator assembly of FIG. 7 shown in a second transmission setting.
Figure 9:
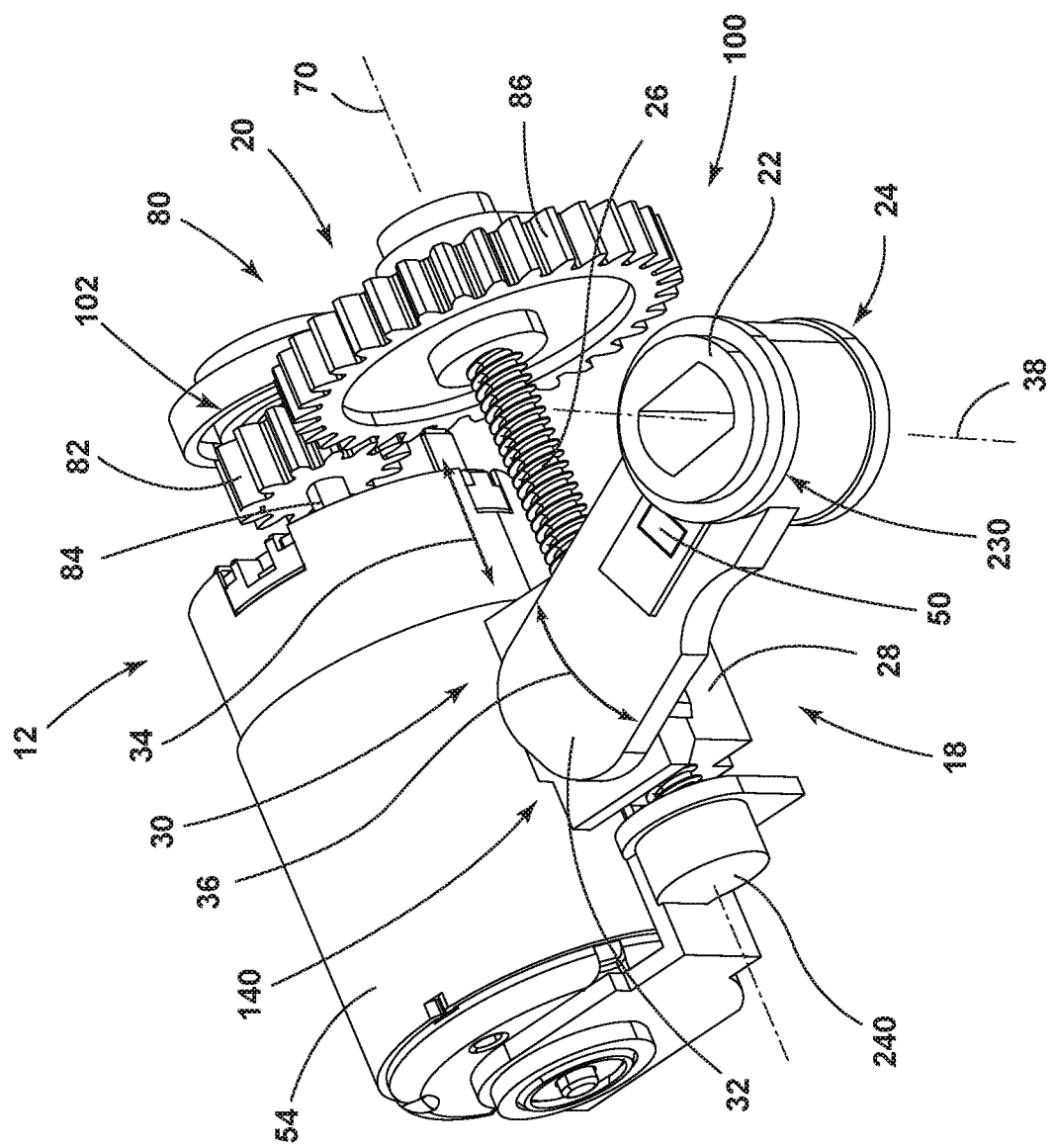
FIG. 9 is a perspective view of the actuator assembly of FIG. 8 shown in a third transmission setting.

Referring now to FIGS. 7-9, as discussed herein, the drive assembly 20 operates to rotate a threaded actuator 26 about a rotational axis 70. During this rotation of the threaded actuator 26, a carriage 28 is translated through a linear operation 34 along the rotational axis 70 of the threaded actuator 26. This linear operation 34 of the carriage 28 is used to define the plurality of actuator positions 30 that correspond to the transmission settings 24. This linear operation 34 of the carriage 28 is translated into a rotational operation 36 of the actuator arm 32 about the interface axis 38 of the transmission selector 22. The positioning magnet 50 attached to the actuator arm 32 also rotates about the interface axis 38 during operation of the drive assembly 20 and carriage 28 for the shift actuator 10. As the actuator arm 32 rotates, the positioning magnet 50 interacts with the position sensor 52 to communicate a position of the positioning magnet 50 and, in turn, the actuator arm 32 relative to the position sensor 52.

Referring again to FIGS. 1-9, after a selection is made using the selector interface 16, the drive assembly 20 is actuated to translate the carriage 28 along the rotational axis 70 of the threaded actuator 26. During this translation of the carriage 28, the positioning magnet 50 moves about the interface axis 38 of the transmission selector 22. When the positioning magnet 50 reaches the desired position that corresponds to the selected actuator position 140 of the carriage 28, which corresponds to the desired transmission setting 24 for the selector interface 16, the position sensor 52 communicates with the drive assembly 20 via a controller 142 to stop operation of the motor 54 of the drive assembly 20. Using the positioning magnet 50 and the position sensor 52, discrete movements of the actuator arm 32 can be detected so that accurate positioning of the carriage 28, the actuator arm 32 and the transmission selector 22 can be achieved for operating the shift-by-wire mechanism 120. Accordingly, the discrete movements of the actuator arm 32 can be translated into corresponding discrete rotations of the transmission selector 22 for operating the shift-by-wire mechanism 120. Using the discrete and incremental movements of the carriage 28, the actuator arm 32, and the transmission selector 22 allows for the size of the shift actuator 10 to be relatively compact. Since the movements of the component parts for the selector actuator 12 are small, minimal amounts of space are required to accommodate the various paths of movement within the motor cavity 60. The mechanical advantages described herein allow for this decrease in size of the shift actuator 10, without sacrificing output torque 102 at the transmission selector 22.

Referring again to FIGS. 4-6, the outer housing 58 for the shift actuator 10 can include a guide portion 150 that maintains the carriage 28 in a fixed rotational position as it translates along the rotational axis 70 of the threaded actuator 26. This guide portion 150 helps to guide the translation of the carriage 28 in the linear operation 34 and through the plurality of actuator positions 30. This guide portion 150 can include a series of grooves or channels 152 that are defined within the outer housing 58. The carriage 28 can also include various tabs 154 or sliding features that interact with the channels 152 defined within the outer housing 58 that serve as the guide portion 150 of the outer housing 58. The guide portion 150 defined within the outer housing 58 and the carriage 28 serves to ensure a smooth linear operation 34 of the carriage 28 as it translates along the rotational axis 70 of the threaded actuator 26. In addition, this guide portion 150 insures that the carriage 28 does not experience any eccentric rotational motion and is thereby confined to a linear operation 34 along the rotational axis 70 of the threaded actuator 26. This confinement of the carriage 28 to only linear operation 34 helps to ensure the accurate motion of the actuator arm 32 and the positioning magnet 50 during operation of the shift actuator 10.

Referring again to FIGS. 2-6, within the outer housing 58, the transmission selector 22 is secured within an interface portion 160 of the outer housing 58. The interface portion 160 helps to position the transmission selector 22 and the actuator arm 32 to rotationally operate about the interface axis 38 of the transmission selector 22. Accordingly, the interface portion 160 of the outer housing 58 can include a hub 162 that at least partially surrounds the transmission selector 22. In addition, it is contemplated that the actuator arm 32 and the transmission selector 22 can be a single piece. It is also contemplated that the actuator arm 32 and the transmission selector 22 can be separate components that are attached together to operate about the interface axis 38 that is defined by the interface portion 160 of the outer housing 58 as well as the transmission selector 22.

Referring again to FIGS. 1-9, a gear selector assembly 170 for a vehicle includes the selector interface 16 that selectively operates the drive assembly 20 having the threaded actuator 26. The carriage 28 translates through a linear operation 34 along the rotational axis 70 of the threaded actuator 26 to define the plurality of actuator positions 30. As discussed above, the carriage 28 is limited to a linear operation 34 and is prevented from operating in a rotational direction or in a direction outside or distal from the rotational axis 70 of the threaded actuator 26. The actuator arm 32 extends between the carriage 28 and a transmission interface 180. The linear operation 34 of the carriage 28 defines the rotational operation 36 of the actuator arm 32 about the interface axis 38 of the transmission selector 22. As discussed above, the transmission selector 22 and the actuator arm 32 can be separate components or can be a single unified piece that operates simultaneously about the interface axis 38 of the transmission selector 22. The transmission interface 180 can be defined by the engagement between the transmission selector 22 and the shift-by-wire mechanism 120. This transmission interface 180 receives the rotational operation 36 of the actuator arm 32 and the transmission selector 22 and turns this rotational operation 36 into instructions for operating the transmission 14 for the vehicle. The motion of the transmission selector 22 can be relatively finite and discrete motions that can be translated into digital instructions or electrical instructions for operating the shift-by-wire mechanism 120 and, in turn, the transmission 14 for the vehicle.

Referring again to FIGS. 4-9, the position sensor 52 of the shift actuator 10 is in communication with the selector interface 16, the actuator arm 32 and the motor 54 of the drive assembly 20 to locate the carriage 28 and the actuator arm 32 at the desired actuator position 30 of the plurality of actuator positions 30. The transmission selector 22 is also included within the shift actuator 10 of the gear selector assembly 170. Linear operation 34 of the carriage 28 along the threaded actuator 26 defines the plurality of actuator positions 30 that corresponds to the respective gear positions 18 of the transmission selector 22. As discussed above, the position sensor 52 includes or is paired with the positioning magnet 50 that operates relative to a magnet sensor 190 of the position sensor 52. This magnet sensor 190 of the position sensor 52 is in communication with the controller 142 and the drive assembly 20. The positioning magnet 50 and the position sensor 52 cooperate to selectively operate the motor 54 of the drive assembly 20 to define the plurality of transmission settings 24. The positioning magnet 50 of the sensor assembly 220 is typically attached to the actuator arm 32 and rotates about the interface axis 38. This movement of the positioning magnet 50 cooperates with the position sensor 52, typically in the form of the magnet sensor 190, to provide positioning information regarding the carriage 28 and the actuator arm 32. This positioning information is used to operate the drive assembly 20 to define the various transmission settings 24 of the transmission selector 22 and the transmission interface 180.

According to various aspects of the device, the outer housing 58 includes a connection terminal 210 that receives a connector 212 for providing electrical power to the drive assembly 20. Data communications are also included within the connector 212 and the connection terminal 210 for exchanging data and positioning information with the controller 142 for the transmission 14 and the shift-by-wire mechanism 120. From the exterior of the outer housing 58, the only portion of the shift actuator 10 that shows movement is the transmission selector 22 that engages with the shift-by-wire mechanism 120 at the transmission interface 180. All other operable components of the shift actuator 10 are included and contained within the motor cavity 60 of the outer housing 58. Through this configuration, dirt, debris and other contaminants can be kept outside of the shift actuator 10 for the gear selector assembly 170. By containing the threaded actuator 26, the carriage 28 and the actuator arm 32 within the outer housing 58, the linear operation 34 of the carriage 28 and the rotational operation 36 of the actuator arm 32 can be maintained for an extended period of time due to the minimal amount of contaminants that may enter into the motor cavity 60.

Referring again to FIGS. 2-6, the connection terminal 210 engages the PCB 56 to deliver electrical power and to send and receive various data regarding the status of the shift actuator 10. To deliver electrical power to the motor 54, the motor 54 includes motor pins 270 that engage connect pins 272 that extend to the PCB 56. During manufacture of the shift actuator 10, the motor 54 can be placed relative to the outer housing 58. The motor pins 270 of the motor 54 can be press fit, or press fit and welded/soldered to the connect pins 272 of the PCB 56. The retainers 240 can then be positioned to secure the motor 54 and other components of the shift actuator 10 within the outer housing 58. The motor 54 can also include positioning features 274 that engage a portion of the shift actuator 10, such as the outer housing 58 to secure the motor 54 within the motor cavity 60.

Referring again to FIGS. 4-6, the outer housing 58 can include opposing housing portions 280 that are attached together to define the outer housing 58. To prevent infiltration of foreign material into the motor cavity 60, the opposing housing portions 280 can include a perimeter gasket 282 that is positioned between the opposing housing portions 280. In addition, the hub 162 of the outer housing 58 can include interior gaskets 284 or O-rings that are positioned at the transmission selector 22. These interior gaskets 284 and the perimeter gasket 282 serve to seal the motor cavity 60 to prevent infiltration of foreign material. The perimeter gasket 282 and the interior gaskets 284 also allow the shift actuator to be splashed with fluid or at least partially submerged within a lubricating fluid of the mechanical assembly. In this manner, the shift actuator 10 can be within a fluid environment while preventing infiltration of the fluid or other foreign material into the motor cavity 60 of the outer housing 58.

According to various aspects of the device, the degree of rotational operation 36 of the actuator arm 32 typically depends upon the length of the threaded actuator 26 and the linear path of travel of the carriage 28 along the threaded actuator 26. In this manner, the amount of rotational operation 36 that the actuator arm 32 experiences can be approximately 45 degrees between the outermost actuator positions 30 of the plurality of actuator positions 30. In certain aspects of the device, the actuator arm 32 may experience a total rotation of approximately 30 degrees between the outermost positions of the plurality of actuator positions 30. In certain aspects of the device, the actuator arm 32 may experience a total rotation of approximately 20 degrees between the outermost positions of the plurality of actuator positions 30. In certain aspects of the device, the actuator arm 32 may experience a total rotation of approximately 15 degrees between the outermost positions of the plurality of actuator positions 30. The degree of rotation of the actuator arm 32 is monitored through the use of the sensor assembly 220 that incorporates the positioning magnet 50 and the magnet sensor 190. These components of the sensor assembly 220 can monitor discrete movements during the rotational operation 36 of the actuator arm 32. Accordingly, the amount of rotation required of the transmission selector 22 for communicating with the shift-by-wire mechanism 120 can be maintained at a small amount for discerning between the various gear positions 18 of the plurality of gear positions 18. Because only finite movements may be needed at the actuator arm 32, the size of the shift actuator 10 can be maintained relatively small so that minimal amounts of space are taken up by the shift actuator 10 and the shift-by-wire mechanism 120 for the transmission 14.

Referring again to FIGS. 1-9, the selector assembly 170 includes the selector interface 16 that selectively operates the drive assembly 20 via the controller 142. The drive assembly 20 includes the threaded actuator 26. The carriage 28 translates along the threaded actuator 26 to define the plurality of gear positions 18. The transmission selector 22 rotates about the interface axis 38. The sensor assembly 220 is in communication with the controller 142 and the carriage 28. Linear operation 34 of the carriage 28 defines the rotational operation 36 of the positioning magnet 50 of the sensor assembly 220 and the transmission selector 22 about the interface axis 38. The sensor assembly 220 cooperates with the drive assembly 20 to locate the carriage 28 and the transmission selector 22 at a desired or selected gear position 230 of the plurality of gear positions 18. As discussed herein, the positioning magnet 50 for the sensor assembly 220 is typically attached to the actuator arm 32 that extends between the carriage 28 and the transmission selector 22. Again, the linear operation 34 of the carriage 28 is translated into rotational operation 36 of the transmission selector 22 via the rotational operation 36 of the actuator arm 32. The PCB 56 that is attached to the outer housing 58, and/or contained within the motor cavity 60, can include the position sensor 52, typically in the form of the magnet sensor 190, that cooperates with the positioning magnet 50 that is attached to the actuator arm 32. Information from the position sensor 52 is communicated to the drive assembly 20 via a controller 142 for the shift actuator 10.

According to various aspects of the device, the drive assembly 20 and the threaded actuator 26 can include various retainers 240 that maintain axial positions of the drive assembly 20 and the threaded actuator 26. These retainers 240 can be coupled to the outer housing 58 to secure the components of the shift actuator 10 within the outer housing 58. These retainers 240 can include caps that engage with the threaded actuator 26, the various portions of the gear train 80 and other portions of the drive assembly 20 for allowing for rotational operation 36 of these components while maintaining axial and lateral positioning. Lubricants, bearings, and other low-friction interfaces can be incorporated within these retainers 240.

According to various aspects of the device, the shift actuator 10 provides for a compact rotary-based shift actuator 10 that efficiently transfers the force or output torque 102 from the motor 54 to the transmission selector 22. Various mechanical advantages are achieved through the gear train 80 and the moment arm defined by the actuator arm 32 that extends between the carriage 28 and the transmission selector 22. The shift actuator 10 operates to drive the transmission 14 to shift between the plurality of gear positions 18. The shift actuator 10 provides a shifting command such that the shift-by-wire mechanism 120 can quickly drive the transmission 14 to operate to the corresponding selected gear position 230.

According to various aspects of the device, the shift actuator 10 can be included within shift-by-wire mechanisms 120 and other various selectors that are incorporated within a vehicular setting. The shift actuator 10 can also be incorporated within other selection interfaces within other mechanical assemblies that are in non-vehicular applications.

The outer housing 58 for the shift actuator 10 can include various connection points 250 that can attach directly to the shift-by-wire mechanism 120, attach the transmission 14, or attach to another component of the vehicle for operating the shift-by-wire mechanism 120. These attachment points serve to fixedly secure the outer housing 58 such that the transmission selector 22 can accurately engage with the transmission interface 180 between the shift actuator 10 and the shift-by-wire mechanism 120.

In certain aspects of the device, the drive assembly 20 can include any one of various motors 54. In one exemplary aspect of the device, the motor 54 for the drive assembly 20 can include a 12-volt DC motor. As discussed herein, the mechanical advantages provided by the gear-reduction mechanism 100 of the gear train 80 as well as the moment arm provided by the actuator arm 32 can provide for a motor 54 having a small amount of power or torque output that can be translated into discrete and accurate movements of the carriage 28, the actuator arm 32 and the transmission selector 22. Where the shift actuator 10 is used for moving a mechanical assembly of the transmission 14, a larger motor 54 may be utilized for providing greater amounts of power or output torque 102 where desired. Typically, using a shift-by-wire mechanism 120, a relatively small sized motor 54 can be utilized.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A shift actuator for a transmission, the shift actuator comprising:
    a drive assembly coupled with a selector interface;
    a transmission selector that operates between a plurality of transmission settings;
    a threaded actuator rotationally operated by the drive assembly;
    a carriage that linearly operates along the threaded actuator to define a plurality of actuator positions that correspond to the plurality of transmission settings; and
    an actuator arm that extends between the carriage and the transmission selector to translate linear operation of the carriage to rotational operation of the transmission selector, wherein the actuator arm includes a positioning magnet that operates relative to a position sensor in communication with the drive assembly, wherein the positioning magnet and the position sensor cooperate to selectively operate a motor of the drive assembly between the plurality of transmission settings.

2. The shift actuator of claim 1, further comprising an outer housing, wherein the drive assembly, the carriage, the positioning magnet and the position sensor are disposed within the outer housing.

3. The shift actuator of claim 2, wherein the position sensor is incorporated into a printed circuit board that is attached to the outer housing.

4. The shift actuator of claim 1, wherein the drive assembly includes a gear train that extends between the motor and the threaded actuator.

5. The shift actuator of claim 1, wherein the drive assembly includes a single dual-direction motor.

6. The shift actuator of claim 1, wherein the carriage and the actuator arm slidably operate relative to one another to translate the linear operation of the carriage into the rotational operation of the actuator arm.

7. The shift actuator of claim 2, wherein the outer housing includes a guide portion that maintains the carriage in a fixed rotational position and guides translation of the carriage through the plurality of actuator positions.

8. The shift actuator of claim 1, wherein the actuator arm and the transmission selector are a single piece.

9. The shift actuator of claim 2, wherein the transmission selector is secured within an interface portion of the outer housing, wherein the interface portion positions the transmission selector and the actuator arm to rotationally operate about an interface axis of the transmission selector.

10. A gear selector assembly comprising:
a selector interface that selectively operates a drive assembly having a threaded actuator;
a carriage that linearly operates along a rotational axis of the threaded actuator to define a plurality of actuator positions;
an actuator arm extending between the carriage and a transmission interface, wherein linear operation of the carriage defines a rotational operation of the actuator arm about the transmission interface;
a position sensor in communication with the selector interface, the actuator arm and a motor of the drive assembly to locate the carriage and the actuator arm at the plurality of actuator positions; and
a transmission selector, wherein the linear operation of the carriage along the threaded actuator defines the plurality of actuator positions that correspond to respective gear positions of the transmission selector, wherein the position sensor includes a positioning magnet that operates relative to a magnet sensor in communication with the drive assembly, wherein the positioning magnet and the position sensor cooperate to selectively operate the motor of the drive assembly between a plurality of transmission settings, wherein the positioning magnet is attached to the actuator arm and the magnet sensor is attached to a printed circuit board.

11. The gear selector assembly of claim 10, further comprising an outer housing, wherein the drive assembly, the carriage, and the position sensor are disposed within a motor cavity of the outer housing, wherein the outer housing includes a guide portion that maintains the carriage in a fixed rotational position and guides translation of the carriage through the plurality of actuator positions.

12. The gear selector assembly of claim 10, wherein the drive assembly includes a gear train extending between the motor and the threaded actuator.

13. The gear selector assembly of claim 10, wherein the carriage and the actuator arm slidably operate relative to one another to translate the linear operation of the carriage into the rotational operation of the actuator arm.

14. The gear selector assembly of claim 11, wherein the transmission selector is secured within an interface portion of the outer housing, wherein the interface portion positions the transmission selector and the actuator arm to rotationally operate about an interface axis of the transmission selector.

15. A selector assembly comprising:
a selector interface that selectively operates a drive assembly via a controller, the drive assembly including a threaded actuator;
a carriage that translates along the threaded actuator to define a plurality of gear positions;
a transmission selector that rotates about an interface axis; and
a sensor assembly in communication with the controller and the carriage, wherein linear operation of the carriage defines a rotational operation of a magnet of the sensor assembly and the transmission selector about the interface axis, and wherein the sensor assembly cooperates with the drive assembly to locate the carriage and the transmission selector at a selected gear position of the plurality of gear positions.

16. The selector assembly of claim 15, wherein the sensor assembly includes a magnet that operates relative to a position sensor in communication with the drive assembly, wherein the magnet and the position sensor cooperate to selectively operate a motor of the drive assembly between the plurality of gear positions.

17. The selector assembly of claim 15, wherein the drive assembly includes a gear train extending between a motor and the threaded actuator.

18. The selector assembly of claim 15, wherein the carriage and the transmission selector slidably operate relative to one another to translate the linear operation of the carriage into the rotational operation of the transmission selector.

19. The selector assembly of claim 15, further comprising an outer housing, wherein the drive assembly, the carriage, and the sensor assembly are disposed within the outer housing.

20. The selector assembly of claim 15, wherein the transmission selector includes an actuator arm that engages the carriage.

* * * * *